UNITED STATES PATENT OFFICE.

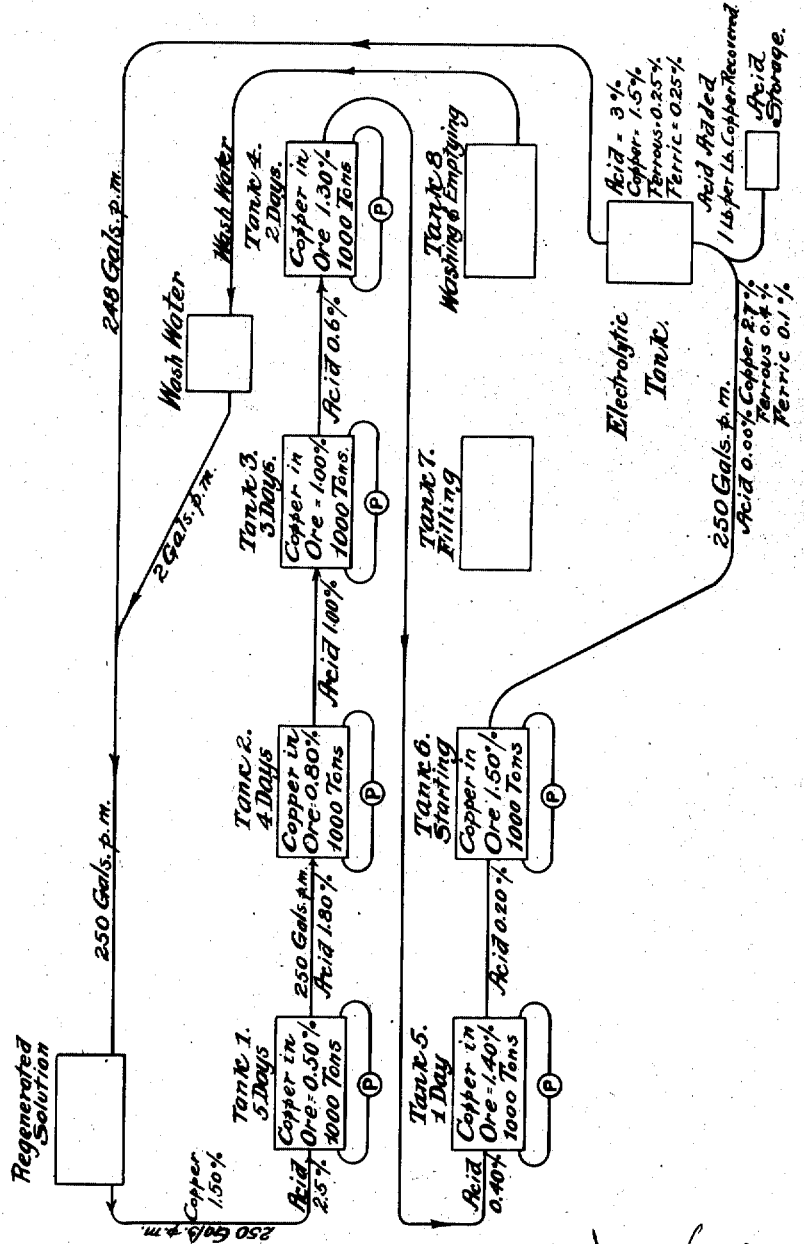

ALBERT W. HAHN, OF EL PASO, TEXAS.

PROCESS OF LEACHING COPPER ORES.

1,282,415.  Specification of Letters Patent.  Patented Oct. 22, 1918.

Application filed January 9, 1915. Serial No. 1,279.

*To all whom it may concern:*

Be it known that I, ALBERT W. HAHN, a citizen of the United States, residing at El Paso, in the county of El Paso and State of Texas, have invented certain new and useful Improvements in Processes of Leaching Copper Ores, of which the following is a specification.

This invention relates to a method of recovering copper by the electrolysis of copper solutions of any suitable kind, obtained by the lixiviation of the ore; and it consists in the operations and sequences of operations set forth in the specification and claims.

I contemplate a treatment of the ore, particularly a low grade ore, in the usual manner. Accordingly, if the ore is an oxid, or one which contains no compound of copper with sulfur, it can be treated direct with the leaching solution. If the copper is present as a sulfid the ore must be roasted in order to make the copper soluble in the lixiviant. The ore is crushed and if necessary roasted so that the copper is in the form of oxids and sulfates. The present method involves the leaching of the ore in such a way as to keep down the ferric iron, aluminum and arsenic content of the solution so as to avoid the reduction of ampere efficiency in the electrolytic tank due to the continuous oxidation of the iron at the anode and the reduction of the iron at the cathode, by the copper itself, and so as to avoid the deleterious effects resulting from accumulation of aluminum and arsenic in solution.

One of the objects of the invention is to provide a continuous process according to which ore in a series of tanks or the like is subjected to the action of leaching solution, which passes through the tanks in succession, whereby all or practically all of the free sulfuric acid or other leaching agent is used up, under which conditions the ferric iron, aluminum, arsenic, antimony and manganese, are eliminated or brought to a minimum in the solution before the latter goes to the electrolytic tank; all without the addition of outside material, because the ore in the tanks, so long as it contains some form of copper oxid or a carbonate, will accomplish the stated result in the operation of my process.

Incidental results are the reduction of acid loss and an increase in the amount of copper recovered per kilowat hour, and the prevention of an accumulation of ferrous iron.

For the sake of clearness I shall describe the process with reference to the accompanying drawing, in which there is shown diagrammatically a lay out of a plant or installation in which the method may be carried out.

In the diagram there is shown a series of eight leaching tanks, though it should be understood that the series-leaching hereinafter explained may be accomplished in any other form of leaching apparatus, as troughs, classifiers or thickeners, and in any usual or preferred way. The number of tanks in the series will be determined by the grade of the ore, or the number of days required for leaching out the copper, and the size of the tanks will be in accordance with the daily capacity of the plant. The leaching tanks have been numbered in the diagram Nos. 1, 2, 3, 4, 5, 6, 7 and 8, and there are also shown included in the system two storage tanks for wash-water, one regenerated solution tank, one electrolytic circulation tank, and an electrolytic tank. Each leaching tank has a circulation pump, which circulates the solution through the ore; the overflowing solution goes back to the circulation pump, except a certain quantity which is advanced to the next tank in the series.

In beginning operations, the tanks are filled with ore in proper condition. A 2.5 per cent. solution of sulfuric acid is now added to tank No. 1, and circulated through the ore for twenty-four hours. On the second day the solution from tank No. 1 is advanced to No. 2, and enough fresh solution advanced for No. 1. At the end of forty-eight hours the solution from No. 2 tank is advanced to No. 3 tank, and if it is neutral it is brought to 2.5 per cent. strength by the addition of fresh acid. During all this time acid solution has been coming through No. 1 tank to No. 2, and now from No. 2 to No. 3. At the end of seventy-two hours, No. 4 tank is cut in, and solution from tank No. 3 advanced to it. Solution is now passing through four tanks. At the end of ninety-six hours No. 5 tank is cut in, and solution advanced to it from No. 4 tank, and we now have five tanks, all circulating solution. Assuming that it requires six days to properly leach the ore, six tanks will be put in series, as above, and solution will have been provided sufficient for the six-tank circuit, electrolytic tank, &c. Of the six tanks now in circuit No. 1 at the end of the fifth day, contains ore that has been leaching for five days and with solution almost full strength; No. 2 tank has been leaching four days and has less acid content than No. 1; No. 3, three days with less acid than No. 2; No. 4 two days, with less acid than No. 3; No. 5 one day, with less acid than No. 4; No. 6 has been standing empty and is now filled with fresh ore and receiving the solution low in acid or neutral, from No. 8, and is almost neutral; No. 7 is being emptied of ore that has been leached six days and washed the previous day; and No. 8 contains ore which has just finished its sixth day of the leach and is being washed. There is in the electrolytic tank, solution which runs 1.5 per cent. copper, three per cent. free sulfuric acid, 0.25 per cent. ferrous iron, and 0.25 per cent. ferric iron. The solution in the electrolytic tank is circulated continuously, and a portion is continuously sent to the regenerated solution tank, whence it in turn passes to tank No. 6. All six tanks containing ore have solution going through them. The rate of flow is governed by the amount of copper in the ore, and the same flow is maintained throughout the system, so that the amount of solution going to the regenerated solution tank from the electrolytic tanks is equal to that coming off from tank No. 6 and going to the electrolytic tank, tanks No. 7 and 8 being for the present out of the solution circuit.

With the circuit thus established, I withdraw from the circuit each day the tank which has been longest under leach, and cut in a tank of fresh ore, so that there will always be (in the present example), six tanks in circuit, one filling, and one emptying, and being washed. Thus, on the seventh day No. 1 tank will be cut out of the circuit, for washing and emptying, No. 2 will have in it ore that has been under leach five days, No. 3, four days, No. 4 three days, No. 5 two days, No. 6 one day, No. 7 will have a charge of fresh ore just beginning the leach, and No. 8 will be filling with fresh ore, and with No. 1 will be out of the solution circuit. And so on from day to day. The result is that the solution, before reaching the electrolytic tank, passes through six tanks, and in the last of the six it encounters a batch of fresh ore. The solution, in going from the first tank to the sixth, necessarily changes, that is, the acid content decreases, the copper increases, the ferrous iron increases, and the ferric iron increases up to the fourth tank, and then sharply decreases. This last result is due to the fact that the ferric iron begins to precipitate, if there is less than 0.50 per cent. of free acid in the solution when it comes in contact with the oxidized copper, &c., in the sixth tank. The whole object of the series of tanks, and the cutting out of the exhausted tank and cutting in of a fresh tank daily, is to have the solution come off the final tank, which is always the tank of fresh ore, neutral. When a neutral solution of ferric sulfate comes in contact with oxid copper ores, such as malachite, azurite, and melaconite, or artificial products approximating these, the following reactions take place:

*Neutralizing and precipitating tank.*

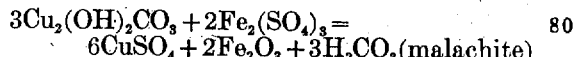
$3Cu_2(OH)_2CO_3 + 2Fe_2(SO_4)_3 =$
$6CuSO_4 + 2Fe_2O_3 + 3H_2CO_3$ (malachite)

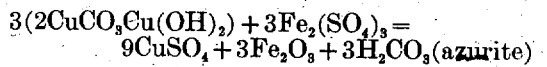
$3(2CuCO_3Cu(OH)_2) + 3Fe_2(SO_4)_3 =$
$9CuSO_4 + 3Fe_2O_3 + 3H_2CO_3$ (azurite)

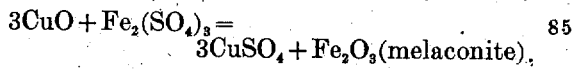
$3CuO + Fe_2(SO_4)_3 =$
$3CuSO_4 + Fe_2O_3$ (melaconite).

Aluminum is precipitated probably as a hydrate, basic or perbasic salt, which is insoluble in a 2.5 per cent. solution of sulfuric acid, and arsenic probably as a ferric arsenite, also insoluble in a 2.5 per cent. solution of sulfuric acid. The ferric iron is thus precipitated, and the solution coming off from the sixth or neutralizing and precipitating tank, low in ferric iron, goes to the electrolytic tanks, where the oxygen given off at the anode will oxidize the ferrous iron to ferric iron, and the ferric iron will in turn attack the copper of the cathode:

*Electrolytic tank.*

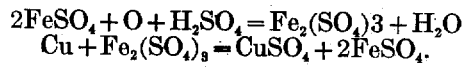
$2FeSO_4 + O + H_2SO_4 = Fe_2(SO_4)3 + H_2O$
$Cu + Fe_2(SO_4)_3 = CuSO_4 + 2FeSO_4.$ Thus ferrous iron is formed, so that the solution coming from the electrolytic tanks will have its iron approximating one half in the ferrous and one half in the ferric state. When it again makes the circuit of the ore practically all of the ferric iron in the regenerated solution will be precipitated, together with any taken up from the ore. In this way the iron may be kept low in the electrolyte.

The electrolytic circuit will be a closed solution circuit, made acid by the addition of sulfuric acid before the solution arrives at the electrolytic tank, because too much power is consumed in electrolyzing a neutral solution or one low in acid. Thus the electrolyte as it is sent to the regenerated solution storage, contains about three per cent. free sulfuric acid. There is, however, daily a quantity of wash-water from the leached ore in the tank last cut out of the solution circuit, and the regenerated solution is mixed with the wash-water, bringing the acid down to the desired 2.5 per cent.

It will be evident that the process is in part based on neutralizing the leaching solution by the ore itself, before it goes to the electrolytic tank, and upon the discovery that the ferric iron content precipitates from the neutral or nearly neutral solution when brought into contact with an oxid of copper, and that this iron, so precipitated, is insoluble in the leaching solution. Each tank full of ore goes through a cycle of six days (in the present example), during which it is treated with solutions increasing in strength from the first day to the sixth, from 0.00 per cent. to 2.50 per cent. sulfuric acid. The "high" acid solution (2.5 per cent.) goes on ore which has already been leached for a number of days, and the almost neutral solution is applied to fresh ore. The oxidation of a portion of the ferrous iron in the electrolytic circuit is also important in the successful working of the process.

I claim:

1. The method which consists in providing a number of tanks in series circuit, each containing ore, progressively advancing acid-leaching solution through the series, neutralizing the solution in the last tank of the series by contact with the ore therein itself to render the ferric iron content of the solution permanently insoluble in the acid-leaching solution and precipitating the ferric iron contents, leading the solution, minus such precipitated ferric iron, to an electrolytic cell, and then electrolyzing the solution, and sending it back to certain of the tanks.

2. The method which consists in providing a number of tanks in series circuit, each containing ore, progressively advancing acid-leaching solution through the series, neutralizing the solution in the last tank of the series by contact with the ore therein itself to render the ferric iron content of the solution permanently insoluble in the acid-leaching solution, and precipitating the ferric iron contents, adding acid, leading the strengthened solution, minus such precipitated ferric iron, to an electrolytic cell and then electrolyzing the solution in the cell, regenerating and sending it back over the circuit.

3. The method which consists in providing a number of tanks in series circuit, each containing ore, progressively advancing acid-leaching solution through the series neutralizing the solution in the last tank of the series by contact with the ore therein itself to render the ferric iron content of the solution permanently insoluble in the acid-leaching solution and precipitating the ferric iron contents, leading the solution, minus such precipitated ferric iron, to an electrolytic cell, and then electrolyzing the solution and sending it back over the circuit, and at intervals cutting the first tank of the series out of the circuit and cutting into the circuit a tank of fresh ore, such fresh tank becoming, in each instance, the last of the series and the solution discharging therefrom being electrolyzed.

4. The method which consists in advancing acid-leaching solution progressively through a series of ore containers, containing respectively ore in progressively different conditions of exhaustion, the first container containing ore which is practically exhausted or leached out and the last containing fresh ore, whereby the strength of the leaching solution decreases from the first to the last tank progressively and in the last tank is neutral, causing the precipitation of the ferric iron contents of the solution by contact with the ore in said tank itself, adding acid, electrolyzing the solution thus purified and strengthened and sending it back to the first tank.

5. The method which consists in advancing acid-leaching solution progressively through a series of ore containers containing respectively ore in progressively different conditions of exhaustion, the first container containing ore which is practically exhausted or leached out and the last containing fresh ore, whereby the strength of the leaching solution decreases from the first to the last tank progressively and in the last tank is neutral, causing the precipitation of the ferric iron contents of the solution by contact with the ore in said tank itself, adding acid, electrolyzing the solution thus purified and strengthened and sending it back to the first tank and at intervals cutting the first tank of the series out of the circuit and cutting into the circuit a tank of fresh ore, such fresh tank becoming in each instance the last of the series and the purified solution therefrom being electrolyzed.

6. As an improved cyclic process involving the leaching of copper ores with a solution of acid and electrolysis of the resulting solution, bringing the solution to the electrolytic cell substantially free from ferric iron, electrolyzing such solution and thereby changing some of the ferrous iron content of the solution to ferric iron in solution, sending the solution back onto the ore, and neutralizing it by the ore itself to cause precipitation of the ferric iron contents of the solution and sending the solution thus freed from such ferric iron content to the electrolytic cell.

7. The method of treating an acid-leaching solution in circulation through a series of tanks of ore, which consists in rendering the solution neutral in the last tank of the series and treating it with copper-bearing material to render the ferric iron permanently insoluble in the leaching solution, electrolyzing and regenerating, and sending it back to the first tank.

8. The method of treating an acid-leaching solution in circulation through a series of tanks of ore, which consists in rendering the solution neutral in the last tank of the series, treating it with copper-bearing material to render the ferric iron permanently insoluble in the leaching solution, adding acid to the solution, electrolyzing and regenerating, and sending it back to the first tank and at intervals cutting out the first tank from the series, and cutting in a tank of fresh ore into the circuit, which becomes the last of the series.

9. The cyclic method which comprises circulating acid-leaching solution through ore until it becomes neutral, then causing it to pass through a fresh charge of ore whereby ferric iron is rendered insoluble and precipitated, adding acid to the solution thus freed from ferric iron, electrolyzing, and sending the solution back to the ore again.

In testimony whereof I affix my signature in presence of two witnesses.

ALBERT W. HAHN.

Witnesses:
C. A. SANTZ,
H. C. ENOS.